United States Patent
Chen et al.

(10) Patent No.: US 8,258,754 B2
(45) Date of Patent: ***Sep. 4, 2012

(54) BATTERY MANAGEMENT SYSTEM AND METHOD

(75) Inventors: Joseph C. Chen, Waterloo (CA); Jonathan Malton, Kitchener (CA)

(73) Assignee: Research In Motion Limited, Waterloo (CA)

( * ) Notice: Subject to any disclaimer, the term of this patent is extended or adjusted under 35 U.S.C. 154(b) by 75 days.

This patent is subject to a terminal disclaimer.

(21) Appl. No.: 12/880,801

(22) Filed: Sep. 13, 2010

(65) Prior Publication Data

US 2010/0332233 A1    Dec. 30, 2010

Related U.S. Application Data

(60) Continuation of application No. 12/608,505, filed on Oct. 29, 2009, now Pat. No. 7,825,631, which is a division of application No. 11/746,184, filed on May 9, 2007, now Pat. No. 7,629,765, which is a continuation of application No. 11/445,664, filed on Jun. 2, 2006, now Pat. No. 7,233,127, which is a continuation of application No. 10/688,294, filed on Oct. 17, 2003, now Pat. No. 7,057,372.

(51) Int. Cl.
*H02J 7/00* (2006.01)

(52) U.S. Cl. ...................................... 320/136

(58) Field of Classification Search ................ 320/106, 320/132, 134, 136; 455/404.1; 704/272; 340/7.37

See application file for complete search history.

(56) References Cited

U.S. PATENT DOCUMENTS

| | | | | |
|---|---|---|---|---|
| 5,307,401 | A * | 4/1994 | Matsuda | 455/575.1 |
| 5,600,230 | A * | 2/1997 | Dunstan | 340/636.13 |
| 5,606,242 | A * | 2/1997 | Hull et al. | 320/106 |
| 5,964,879 | A * | 10/1999 | Dunstan et al. | 713/340 |
| 6,160,490 | A * | 12/2000 | Pace et al. | 340/7.37 |
| 6,229,988 | B1 * | 5/2001 | Stapefeld et al. | 340/7.35 |
| 6,314,308 | B1 * | 11/2001 | Sheynblat et al. | 455/574 |
| 6,393,401 | B1 | 5/2002 | Loudermilk et al. | |
| 6,408,172 | B1 * | 6/2002 | Alperovich et al. | 455/404.1 |
| 6,408,196 | B2 * | 6/2002 | Sheynblat et al. | 455/574 |
| 6,427,072 | B1 * | 7/2002 | Reichelt | 455/404.1 |
| 6,445,937 | B1 * | 9/2002 | daSilva | 455/574 |
| 6,898,446 | B2 * | 5/2005 | Muto | 455/574 |
| 7,057,372 | B2 * | 6/2006 | Chen et al. | 320/106 |
| 7,233,127 | B2 * | 6/2007 | Chen et al. | 320/106 |
| 2001/0023198 | A1 | 9/2001 | Muto | |
| 2001/0029196 | A1 * | 10/2001 | Wakamatsu | 455/574 |
| 2002/0016189 | A1 | 2/2002 | Sheynblat et al. | |
| 2002/0082059 | A1 * | 6/2002 | Nariai et al. | 455/573 |
| 2002/0147037 | A1 * | 10/2002 | Kwon | 455/574 |
| 2002/0177475 | A1 * | 11/2002 | Park | 455/574 |
| 2003/0158609 | A1 * | 8/2003 | Chiu | 700/22 |
| 2005/0085277 | A1 * | 4/2005 | Chen et al. | 455/572 |

FOREIGN PATENT DOCUMENTS

JP    2002 017047 A    1/2002

* cited by examiner

*Primary Examiner* — Jue Zhang
(74) *Attorney, Agent, or Firm* — Jones Day

(57) ABSTRACT

A battery-management method is performed by a battery-operated device. The method includes allocating a first portion of a battery capacity to a first function and a second portion of the battery capacity to a second function. The method further includes simultaneously displaying a first indicator relating to the first portion of the battery capacity and a second indicator relating to the second portion of the battery capacity.

20 Claims, 8 Drawing Sheets

BATTERY MANAGEMENT SYSTEM AND METHOD

CROSS REFERENCE TO RELATED APPLICATIONS

This is a continuation of U.S. application Ser. No. 12/608,505, filed Oct. 29, 2009, which is a division of U.S. application Ser. No. 11/746,184, filed May 9, 2007 (now U.S. Pat. No. 7,629,765), which is a continuation of U.S. application Ser. No. 11/445,664, filed Jun. 2, 2006 (now U.S. Pat. No. 7,233,127), which is a continuation of U.S. application Ser. No. 10/688,294, filed Oct. 17, 2003 (now U.S. Pat. No. 7,057,372), all the above applications hereby incorporated herein by reference.

BACKGROUND

1. Field of the Invention

The invention relates generally to power supply systems, and in particular to a battery management system in a mobile communication device.

2. Description of the Related Art

A typical mobile communication device is powered by a rechargeable battery. However, the same mobile communication device may also include several subsystem circuits, such as input/output (I/O) circuits, wireless communication circuits, processing circuits, and the like, to support such device functions as voice communication functions and data communication functions.

Each device function may be supported by one or more subsystem circuits. The activity period of a subsystem circuit varies according to the function activated at the mobile communication device. Thus, power requirements may vary significantly among device functions, due to differences among the subsystem circuits supporting each function and the activity periods of each subsystem circuit. If battery charge is low, the mobile communication device may be able to support lower power functions, but unable to support higher power functions.

Given their larger current requirements, higher power functions discharge a battery more quickly than lower power functions, and may therefore discharge the battery to such a low level that neither higher power functions nor lower power functions may be used. Battery discharge rates are also affected by temperature, such that a battery often discharges more quickly at lower temperatures, during cold weather conditions for example. Although surface charge of a battery may initially support some lower power functions, thereby to reduce cold battery discharge at low temperatures, power requirements for higher power functions are not significantly reduced by surface charge. As such, lower power functions may be preferred over higher power functions when a battery is at a low temperature.

Known power management systems for mobile communication devices typically provide visual or aural indicators that a battery charge is low. Other power management systems reserve battery charge for a one-time operation of a function, such as an emergency 911 call, when the battery charge is low. Still other power management systems provide various power modes dependent upon battery charge level.

SUMMARY

According to one aspect of the invention, a battery management system manages a plurality of subsystem circuits and functions of a mobile communication device powered by a battery. The battery management system comprises a battery monitoring circuit operable to monitor a present battery capacity and generate a battery capacity signal based on the present battery capacity, a user interface operable to receive a user input allocation of battery capacity among the subsystem circuits and functions, and a battery management module operable to receive the user input allocation and the battery capacity signal, and selectively to disable each subsystem circuit or function when each subsystem circuit or function has depleted its allocation of battery capacity.

In accordance with another aspect of the invention, a method for managing a plurality of subsystem circuits and functions of a mobile communication device powered by a battery comprises allocating battery capacity among the subsystem circuits and functions, comparing a present battery capacity of a battery to respective amounts of battery capacity depleted by the subsystem circuits and functions, and selectively disabling each subsystem circuit or function after each subsystem circuit or function has depleted its allocation of battery capacity.

DETAILED DESCRIPTION

Figure 1:
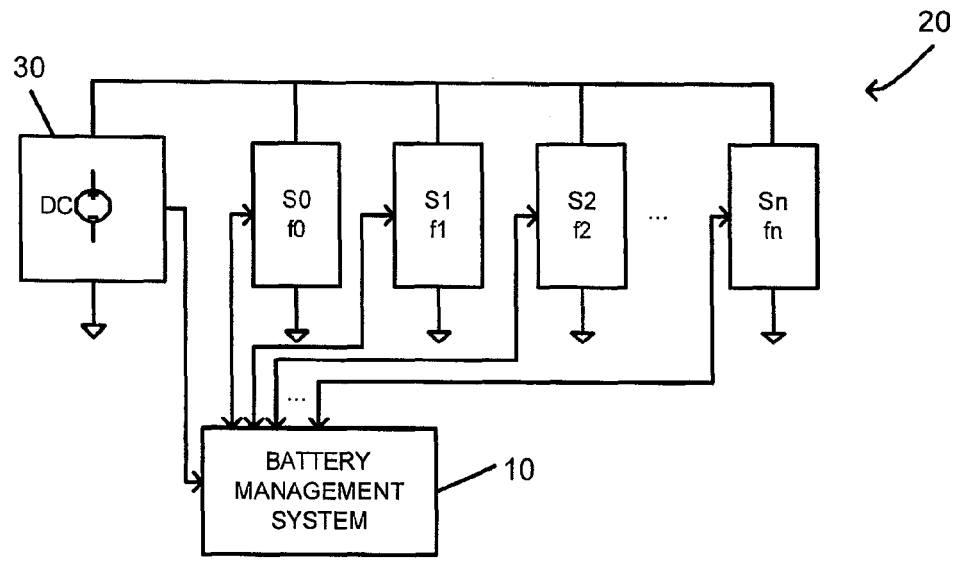
FIG. 1 is a block diagram of a battery management system in a mobile communication device.

FIG. 1 is a block diagram of a battery management system 10 in a mobile communication device 20. The mobile communication device 20 illustratively comprises a power subsystem 30 and a plurality of subsystem circuits S0, S1, S2 . . . Sn. Each subsystem circuit S0, S1, S2 . . . Sn supports a corresponding function set f0, f1, f2 . . . fn. The mobile communication device 20 may be realized by a data messaging device, a two-way pager, a cellular telephone with data messaging capabilities, a wireless Internet appliance, or other data communication devices, depending on the functionality provided. An exemplary mobile communication device 20 is described in detail with reference to FIG. 13 below.

Each function set may include common functions. Thus, one or more subsystem circuits S0, S1, S2 . . . Sn may be activated to support a corresponding common function. For example, if the mobile communication device 20 is a cellular telephone with Internet connectivity, a voice function fv of placing and maintaining a cellular telephone call may require activation of several subsystem circuits, such as a display and keyboard subsystem (illustratively S0), a speaker/microphone subsystem (illustratively S1), and a wireless communication subsystem (illustratively S2). Accordingly, function sets f0, f1 and f2 each include the voice function fv.

A data function fd for receiving a Wireless Access Protocol (WAP) deck, however, may require activation of only the display and keyboard subsystem S0 and the wireless communication subsystem S2. Accordingly, only the function sets f0 and f2 include the data function fd.

Additionally, a subsystem circuit S0, S1, S2 . . . Sn may have an associated unique function. For example, if the subsystem circuit S0 is a keyboard and display subsystem, then a backlighting function may be included only in the function set f0.

The power requirements for each function may vary significantly, and typically depend on which subsystem circuits are required to support each function and the active duration of each subsystem circuit during the performance of each function. To illustrate, in a standby mode in which no functions are being performed, a typical mobile communication device draws about 0.5-1 milliamps. During the execution of functions, however, the keyboard and display subsystem S0, with backlighting activated, draws about 200-300 milliamps; the speaker/microphone subsystem S1 draws several milliamps; and the communication subsystem S2 draws about 200-300 milliamps.

Executing a voice function fv, such as a telephone call, requires the supporting subsystem circuits S0, S1 and S2 to be active during the duration of the telephone call. The communication subsystem S2 transmits and receives data during the duration of the telephone call, the display and keyboard subsystem S0 display call data, and the speaker/microphone subsystem S0 converts between audio and electrical signals. Thus, while performing a voice function fv, the mobile communication device 20 may draw from 200-300 milliamps without backlighting, and from 400-600 milliamps with backlighting.

For the data function fd, however, the active period of the communication subsystem S2 will typically be of a much shorter duration than during a voice function fv, as the communication subsystem S2 will typically transmit a simple request, such as a Uniform Resource Identifier (URI) query, and wait to receive response data. After the response data is received, the user may examine the data via the keyboard and display subsystem S0. Accordingly, the data function fd requires much less average power than the voice function fv, as the communication subsystem S2 is typically active for only several hundred milliseconds rather than the several minutes of the voice function fv. For example, when performing a data function fd without backlighting, the mobile communication device 10 will usually draw only several milliamps, with an occasional instantaneous demand of 200-300 milliamps from the communication subsystem S2.

In operation, a typical mobile communication device will notify the user of a low battery charge by either an aural or visual alarm. Often a user will have only a short time remaining before the battery charge is depleted to such a state that all functions are disabled, which may inconvenience the user. For example, a user of a mobile communication device having cellular telephone, e-mail, and web access functions may learn of time-critical information during a cellular telephone call and need to access e-mail and several web sites after the cellular telephone call. In this case, if the user receives a low battery charge notification during the telephone call and does not have an alternate available power source for the mobile communication device, the user may need to conserve power for the e-mail and web access data functions, by cutting the cellular telephone call short, for example. It is also possible that, before the user receives or becomes aware of the notification, the battery charge has already been depleted to such a degree that the e-mail or web access data functions are inoperable until the battery is recharged. This precludes the user from accessing the time-critical information.

The battery management system 10 of FIG. 1 allows a user of the mobile communication device 20 to allocate battery capacity among the subsystem circuits and functions. Thus, a user may allocate a percentage of battery capacity (e.g., battery charge or battery time) to voice functions and a remaining percentage of battery capacity to data functions. Accordingly, when the battery capacity for voice functions is depleted, there may still be remaining battery capacity to support the data functions. Likewise, when battery capacity for data functions is depleted, there may be remaining battery capacity to support the voice functions.

Figure 2:
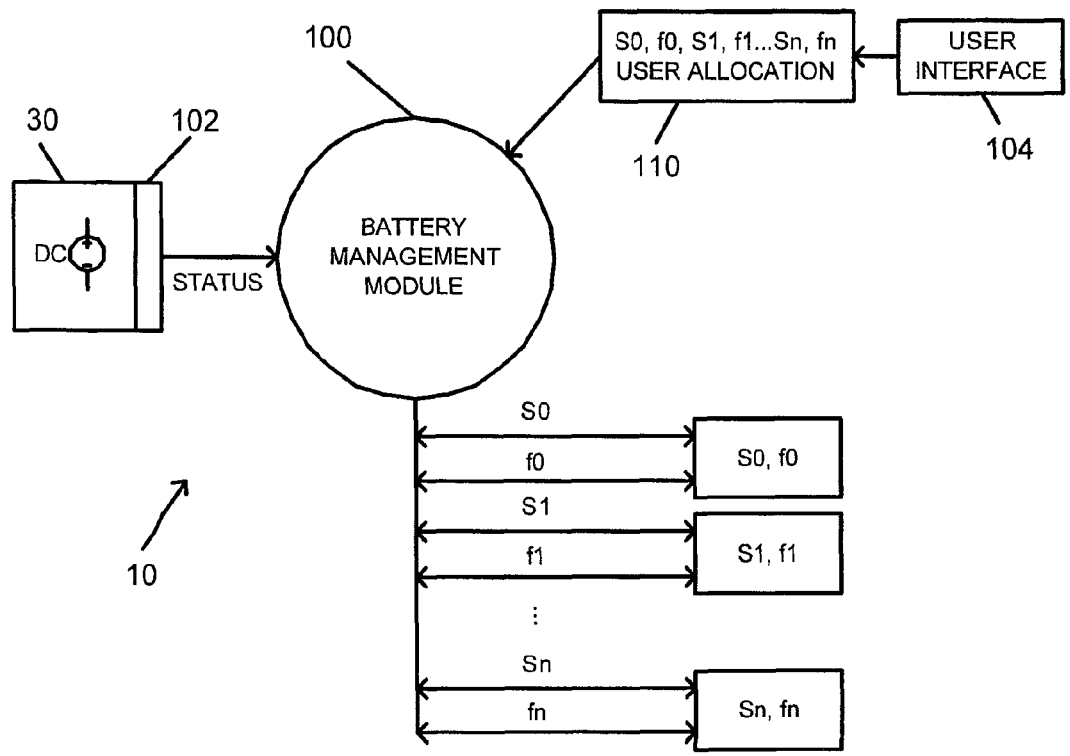
FIG. 2 is a block diagram of one embodiment of the battery management system.

FIG. 2 is a block diagram of one embodiment of the battery management system 10. The battery management system includes a battery management module 100, a battery monitoring circuit 102, and a user interface 104. The battery monitoring circuit 102 is operable to provide a status of one or more battery status indicators, such as remaining capacity, temperature, voltage, current draw, and the like. The battery status indicators may be provided in either analog or digital form. Exemplary battery monitoring circuits include a simple voltage monitor to measure the battery voltage, or alternatively a voltage monitor, a current monitor, and a temperature monitor coupled to a digital logic circuit that estimates a remaining battery capacity based on one or more variables of voltage, current, and temperature. Such battery monitoring circuits are well known in the art and are therefore not described in further detail.

In another embodiment, a so-called "smart battery" may be used. A smart battery includes electronic components and software that enable measurements and calculations of battery capacity, and communicates with other components such as a processor of the mobile communication device 20. In this embodiment, the battery monitoring circuit 102 may be incorporated into the smart battery.

A user interface 104 is operable to receive a user-input allocation of battery capacity among the subsystem circuits and functions. The user interface 104 may comprise a touch sensitive display, or a combination keyboard and display, or any other I/O circuit that provides a user a capability to input an allocation of battery capacity among the subsystem circuits and functions. Indications of remaining allocated battery capacity may also be provided to a user via the user interface 104, as described in further detail below with reference to FIG. 12.

The battery management module 100 is operable to receive the user-input allocation 110 from the user interface 104 and the battery status signal from the battery monitoring circuit 102. It also selectively disables each subsystem circuit or function when each subsystem circuit or function has depleted its allocation of battery capacity. The battery management module 100 may be implemented as a stand alone module, such as an Application Specific Integrated Circuit (ASIC) and software, or alternatively as a software program executed by an existing system processor in the mobile communication device 20.

Battery capacity may be allocated based on function, supporting subsystem circuits, or some combination thereof. In one embodiment, the battery capacity is allocated based on functions. For example, a user may allocate a percentage of full battery charge to a voice function fv, and allocate a remaining percentage of full battery charge to a data function fd. Thus, the voice function fv is disabled when it has depleted its allocation of battery capacity. The data function fd, however, is still operable at the mobile communication device 20 if the data function fd has not yet depleted its allocation of battery capacity.

In this embodiment, the battery management module 100 is operable to monitor the percentage of full battery charge expended by each function. Such monitoring may be accomplished, for example, by monitoring the milliamp-hours expended for each function performed. During the performance of a particular function f, the battery management module 100 receives a corresponding indicator related to the current provided by the mobile communication device 20 battery 30. For example, the monitoring of an average current of 250 milliamps for a 30-minute cellular telephone call would result in a monitored value of 125 milliamp hours. The monitored value is then compared to the battery rating. Accordingly, if the battery is rated at 1000 milliamp hours, the voice function fv has depleted 12.5% of the battery charge.

Consider an illustrative example in which a voice function fv has been allocated 60% of full battery charge and depleted 55% of the full battery charge, and a data function fd has been allocated 40% of full battery charge and depleted 5% of the full battery charge. The voice function fv therefore has only 5% of the full battery charge remaining, whereas the data function fd has 35% of full battery charge remaining. When the voice function fv depletes or has nearly depleted its remaining allocated battery charge, the mobile communication device 20 issues a corresponding "low battery" notification for the voice function fv on the user interface 104. However, the mobile communication device 20 still has ample power remaining for carrying out the data function fd. Thus the e-mail and web access data functions, referenced in the example above, may be executed so that the user receives the time-critical information.

In another embodiment, the user may allocate a percentage of total battery time to a voice function fv, and allocate a remaining percentage of total battery time to a data function fd. For example, if a mobile communication device 20 is rated to provide 90 minutes of continuous use for a particular battery at full charge, then the voice function fv may be allocated 60 minutes of battery time, and the data function fd may be allocated the remaining 30 minutes of battery time. The battery management module 100 is then operable to monitor the time of use for each function. Such monitoring may be accomplished, for example, by monitoring a clock during the performance of each function and incrementing a function time variable associated with each function.

In a further embodiment, one function may be allocated a percentage of battery capacity, and the remaining functions are not subject to a battery allocation. Thus, a user may allocate a certain percentage of battery capacity to a particular data function, but all remaining functions may use up to 100% of the battery capacity either alone or in combination.

Upon determining that a particular function has depleted its allocation of battery capacity, the battery management module 100 may selectively disable the function. The function may be disabled while it is being performed (e.g., by terminating a cellular telephone call), or after the function is completed (e.g., after the cellular telephone call is completed). For example, if the voice function fv has depleted its allocation of battery capacity, then the display and keyboard subsystem S0, the speaker/microphone subsystem S1, and the wireless communication subsystem S2 in FIG. 1 are precluded from performing the voice function fv. However, the display and keyboard subsystem S0 and the wireless communication subsystem S2 may still be utilized to perform the data function fd.

Where a particular subsystem S is solely associated with a disabled function f, such that the subsystem S is active only when the function f is performed, then the subsystem S may be disabled when the function f has depleted its allocation of battery capacity. A particular subsystem may be disabled by the activation of a solid state switch or other known switching or disabling methods. For example, if the subsystem S0 is an infrared communication circuit that supports a single local communication function f0 which has depleted its allocation of battery capacity, then the battery management module 100 may selectively disable both the local communication function f0 and the infrared communication circuit S0.

The battery management module 100 may be further configured to monitor the self-discharge of the battery 30 via the battery monitoring circuit 102. The self-discharge may then be apportioned to each allocation of battery capacity either equally or according to the allocation. In the above example of a 60%/40% allocation between a voice function fv and a data function fd, a 10% self discharge of the battery 30 after a period of inactivity may be apportioned as 5% for each of fv and fd in an equal apportion scheme or 6% for fv and 4% for fd in a pro-rata apportion scheme.

Of course, allocations may be based on other functions instead of voice functions and data functions. For example, if the mobile communication device 20 is operable to perform a digital communication function fvd, an analog communication function fva, an e-mail function fde, and a calendar function fc, the user may allocate battery capacity to each individual function.

Figure 3:
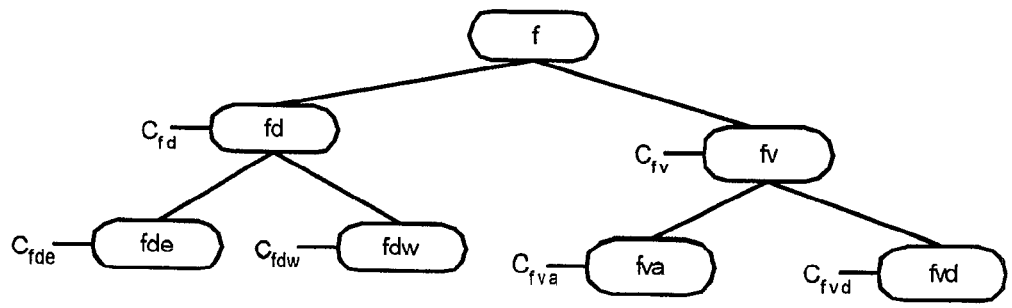
FIG. 3 illustrates a hierarchical allocation of battery capacity.

Battery capacity may also be allocated according to a hierarchical allocation. FIG. 3 illustrates a hierarchical allocation of battery capacity. In the embodiment of FIG. 3, the hierarchical allocation is based on a per-function allocation of battery capacity. However, the hierarchical allocation may also be based on subsystem circuits or a combination of subsystem circuits and functions.

In FIG. 3, f represents a set of functions that are to be controlled by a battery management system. The set of functions f may be the entire set of functions performed by the mobile communication device or a subset of those functions. The functions f are illustratively divided into two function subsets: voice functions fv and data functions fd. The voice functions fv are divided into two subsets: analog voice functions fva, and digital voice functions fvd. Likewise, the data functions fd are divided into two subsets: e-mail data functions fde, and web browsing data functions fdw. The user, via a user interface, may selectively allocate battery capacity among the voice functions fv and the data functions fd according to the hierarchy. For example, the user may specify maximum battery allocations $C_{fv}$ and $C_{fd}$ for the voice and data functions fv and fd, maximum battery allocations $C_{fva}$, $C_{fvd}$, $C_{fde}$, and $C_{fdw}$ for the voice and data functions fva, fvd, fde, and fdw, or any combination thereof. Generally, the battery capacity allocation for each function is less than or equal to that of its associated parent function in the hierarchy. Thus, $C_{fv} \geq C_{fva}$, $C_{fvd}$ and $C_{fd} \geq C_{fde}$, $C_{fdw}$.

An illustrative allocation is provided in table 1 below.

TABLE 1

Hierarchical Allocation

| | |
|---|---|
| $C_{fv}$ | 60% |
| $C_{fva}$ | 30% |
| $C_{fvd}$ | 60% |
| $C_{fd}$ | 40% |
| $C_{fde}$ | 20% |
| $C_{fdw}$ | 20% |

According to the allocation of table 1, the voice functions fv are allocated 60% of the battery capacity, and the data functions are allocated 40% of the battery capacity. For the voice function allocation $C_{fv}$, the analog voice function allocation $C_{fva}$ is 30% and the digital voice function allocation $C_{fvd}$ is 60%. Accordingly, the analog voice function fva may use only 30% of the battery capacity, and the digital voice function may use up to 60% of the battery capacity. When the analog voice function fva has depleted 30% of the battery capacity, the function is disabled. Likewise, when the digital voice function fva has depleted 60% of the battery capacity, the function is disabled. Additionally, once the battery capacity depleted by the analog and digital voice functions fva and fvd totals 60%, all voice functions fv are disabled.

Similarly, the e-mail data function allocation $C_{fde}$ is 20%, and the web browsing data function allocation $C_{fdw}$ is also 20%. Accordingly, when the e-mail data function fde has depleted 20% of the battery capacity, the function is disabled. Likewise, when the web browsing data function fdw has depleted 20% of the battery capacity, the function is disabled. Once the battery capacity depleted by the data functions fde and fdw totals 40%, all data functions fd are disabled.

Figure 4:
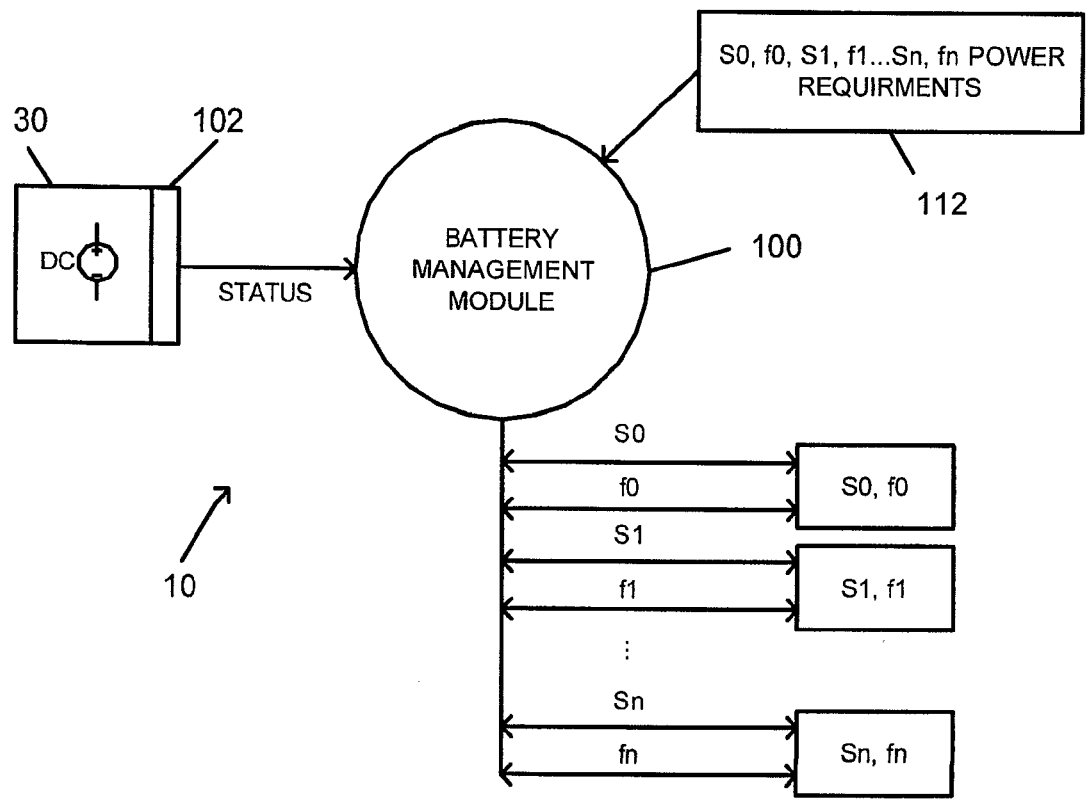
FIG. 4 is a block diagram of another embodiment of the battery management system.

FIG. 4 is a block diagram of another embodiment of the battery management system 10. In this embodiment, the battery management module 100 is operable to receive a power requirement 112 associated with each subsystem circuit or each subsystem function, and selectively to disable subsystem circuits or functions when the present battery capacity cannot support the corresponding power requirements of the subsystem circuits or functions.

The power requirements may be minimum power requirements or selected power requirements. A minimum power requirement specifies a minimum battery capacity value required by the subsystem circuits or functions to operate. For example, if a battery charge must be at least 10% of a full battery charge to enable the operation of a voice function fv, then the voice function has a minimum power requirement of 10%. The minimum power requirements may be default values determined by the mobile communication device manufacturer, and stored in a memory such as a Flash memory or a ROM. Alternatively, the minimum power requirements may be input by a user via the user interface 104.

A selected power requirement specifies a minimum battery capacity below which the subsystem circuits or functions are precluded from operating. Although a function or its supporting subsystem circuits may be operable when battery capacity is below a selected requirement, the battery management module 100 disables the function when the selected power requirement cannot be supplied. Where a voice function fv has a selected power requirement of 50%, then the voice function fv is selectively disabled when the battery charge falls below 50% of a full battery charge. The selected power requirements may be default values selected by the mobile communication device manufacturer and stored in a memory such as a Flash memory or a ROM, or input by a user via the user interface 104.

Figure 5:
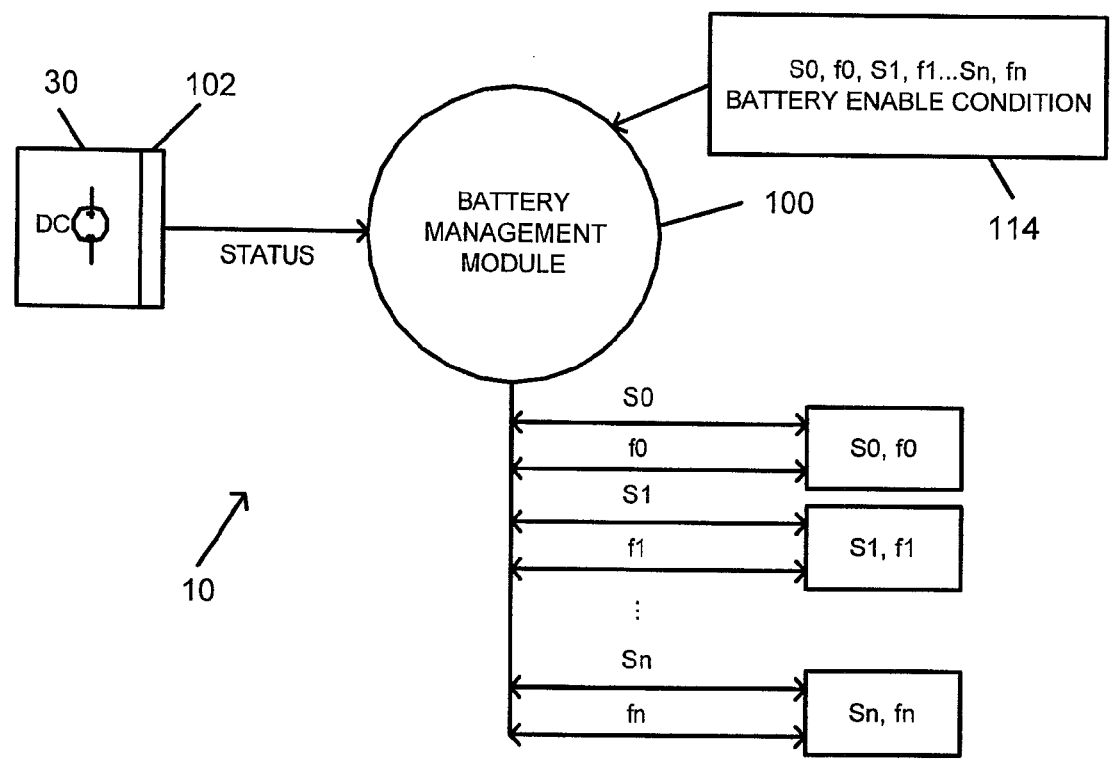
FIG. 5 is a block diagram of another embodiment of the battery management system.

FIG. 5 is a block diagram of another embodiment of the battery management system 10. In this embodiment, the battery management module 100 is operable to assign to each subsystem circuit and function a battery enable condition 114, to receive a battery condition signal from the battery monitoring circuit 102, and selectively to disable the subsystem circuits and functions based on a comparison of the corresponding battery enable condition to the present battery condition signal.

Battery enable conditions include, for example, a power requirement, as described with respect to FIG. 4, a battery capacity allocation, as described with reference to FIG. 2, and an enable temperature. In the latter case, the battery monitoring circuit 102 provides a present battery temperature to the battery management module 100, and the battery management module 100 is operable selectively to disable the subsystem circuits or functions having corresponding enable temperatures greater than the present battery temperature.

As described above, when the battery temperature is low, such as during a cold weather condition, the battery 30 tends to discharge more quickly, and lower power functions may thus be preferred over higher power functions. Precluding operation of a subsystem circuit or function having an enable temperature greater than the current battery temperature prevents excessive discharge of the battery due to cold temperature operation. In one embodiment, a battery enable temperature is associated with each subsystem circuit. Generally, the battery enable temperature is lower for subsystem circuits having a low power requirement. For example, a LCD display typically draws a current of less than 1 milliamp, while a wireless communication subsystem typically requires at least 200 milliamps to transmit data. Accordingly, the LCD display may have a lower enable temperature than the communication subsystem.

Corresponding functions associated with each subsystem circuit having an enable temperature greater than the present battery temperature are likewise disabled, as the required subsystems are precluded from operating. Each subsystem circuit is enabled as the present battery temperature exceeds the subsystem circuit enable temperature. Once all required subsystem circuits for a particular function are enabled, the particular function is then enabled. Functional status may be provided to the user via the user interface 104.

In another embodiment, a battery enable temperature is associated with each function. This embodiment provides for a lower enable temperature for functions having a low power requirement or for functions having a relatively high power requirement of short duration. For example, a keyboard and display backlighting function, which may require 200 milliamps, may have a relatively high enable temperature. An address book function, however, may have a relatively low enable temperature, as the display, keyboard, processor and memory may draw only several milliamps during operation, provided backlighting of the display and keyboard is precluded.

A data function fd may also have a relatively low enable temperature, as the data function fd requires several hundred milliamps for a relatively short duration. For example, the communication subsystem S2 will typically transmit a simple request, such as a Uniform Resource Identifier (URI) query during the execution of a data function fd, and wait to receive responsive data. The transmission of the URI query may require only several hundred milliseconds (or less) of transmission time. Accordingly, the data function fd will not cause as significant a battery discharge as a corresponding voice function fv at the same battery temperature. Furthermore, battery surface charge may initially provide enough power to support the data function fd, which further limits battery discharge.

The enable temperatures may be input by the user via a user interface 104 or provided by the manufacturer of the mobile communication device and stored in a memory. Furthermore, the enable temperature may be adjusted for particular battery chemistries, such as Nickel Metal Hydride (NiMH) batteries, Nickel Cadmium (NiCd) batteries, and Lithium Ion (LiION) batteries. The LiION rechargeable battery, for example, has a broader operating temperature range than the NiMH and NiCd batteries. Thus, the enable temperatures may be set lower for a LiION battery than for a NiMH or NiCd battery. For example, a voice function fv may have an enable temperature of 0° C. for a LiION battery, and an enable temperature of 5° C. for a NiMH or NiCd battery.

The battery chemistry type may be input by the user or a default battery chemistry recommended by the manufacturer. If the enable temperatures are also set by the manufacturer, then the enable temperatures may include a first set of enable temperatures according to a recommended battery chemistry and additional sets of enable temperatures according to alternate battery chemistries. The enable temperatures used may then be later changed by the user if the user switches to a battery chemistry different from the recommended battery chemistry. The user may specify the battery chemistry via the user interface, or the battery may be a smart battery that includes circuitry that identifies the particular battery chemistry to the mobile communication device.

In another embodiment, the battery is a smart battery and further includes enable temperatures stored in a battery memory. Accordingly, the battery management module 100 receives the enable temperatures from the smart battery when the smart battery is connected to the mobile communication device.

FIGS. 6-10 are flow diagrams of battery management processes. The flow diagrams may be implemented by software that is executable on a processing device in the mobile communication device 20 (FIG. 1), and by monitoring and control circuitry. The software comprises instructions that cause the mobile communication device to perform the steps described below, and may be machine or object code, an interpreted language, a script language, or even a platform independent language. Other types of software may also be used. Alternatively, the flow diagrams may be implemented by digital logic elements, an ASIC module, or other hardware or firmware.

Figure 6:
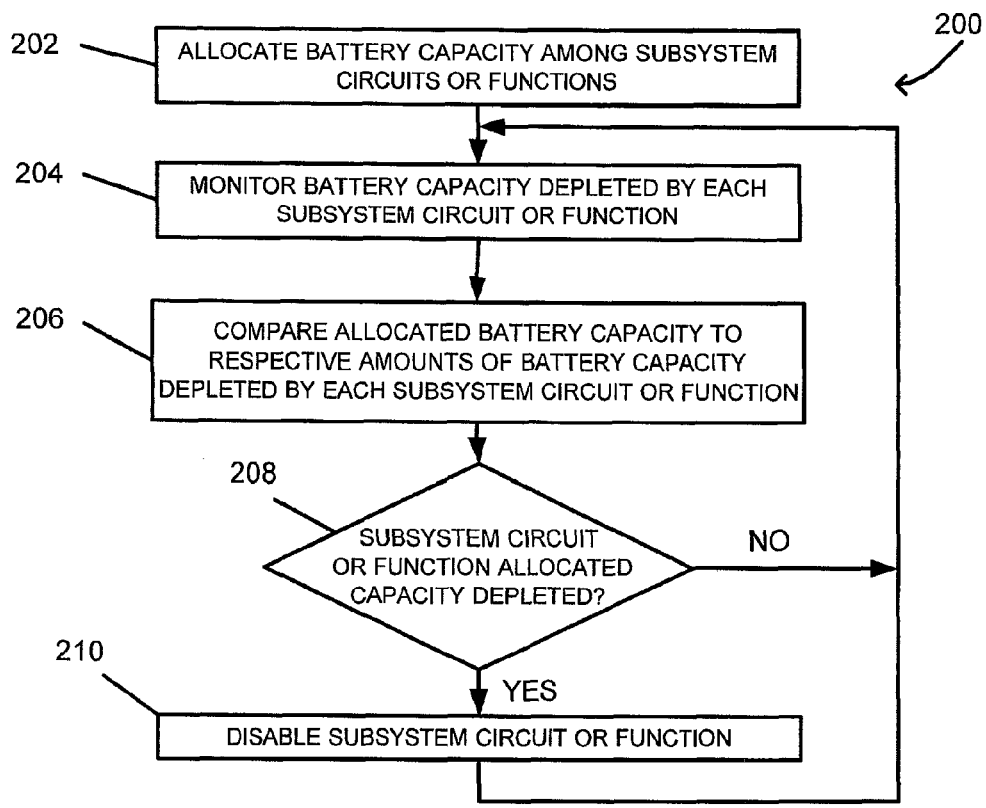
FIG. 6 is a flow diagram of a battery management process based on subsystem circuit and function battery capacity allocation.

FIG. 6 is a flow diagram 200 of a battery management process based on battery capacity allocation. At step 202, battery capacity is allocated among the subsystem circuits or functions to be controlled, in accordance with either user inputs as described above or manufacturer settings read from memory. The battery capacities may be allocated to subsystem circuits only, to functions only, or to both subsystem circuits and functions.

Step 204 monitors the battery capacity depleted by each subsystem circuit or function. The amount of battery capacity depleted by each subsystem circuit or function may be measured by milliamp hours, an amount of battery time, or other metric.

At step 206, the allocated battery capacity is compared to corresponding amounts of battery capacity depleted by each controlled subsystem circuit or function. It is then determined at step 208 whether any subsystem circuits or functions have depleted their allocated capacities. If no subsystem circuit or function has depleted its allocated capacity, then steps 204 through 208 are repeated.

If a subsystem circuit or function has depleted its allocated capacity, however, then the subsystem circuit or function is disabled in step 210, and steps 204, 206 and 208 are repeated. The subsystem circuits and functions may be disabled according the interrelation of subsystem circuits and functions, as previously described.

Figure 7:
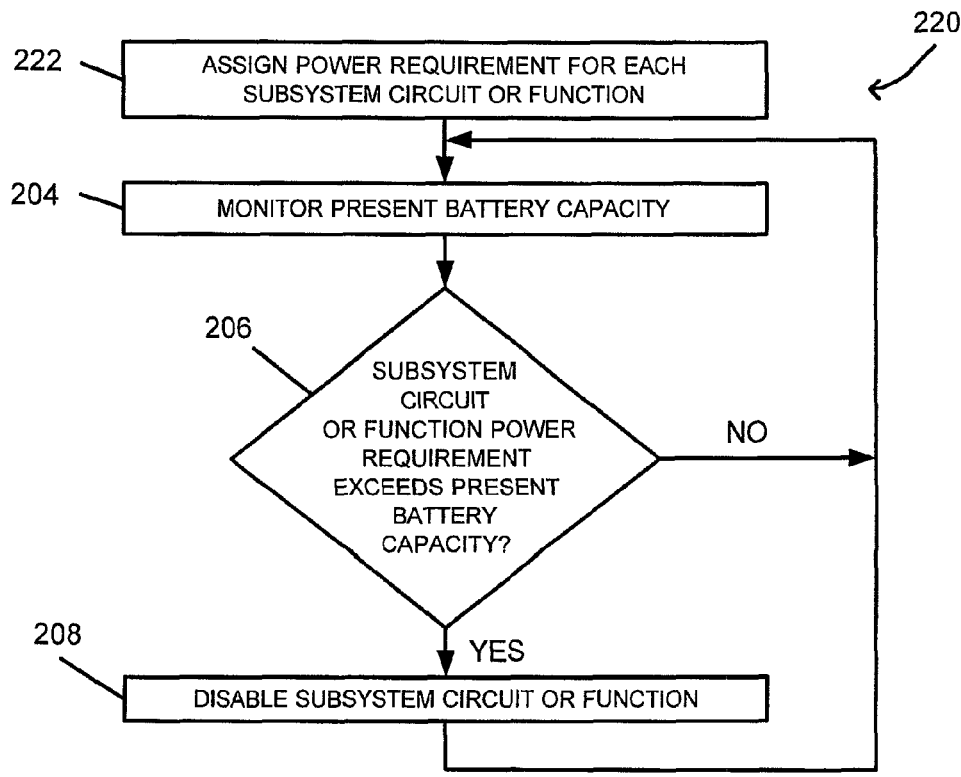
FIG. 7 is a flow diagram of a battery management process based on subsystem circuit and function power requirements.

FIG. 7 is a flow diagram 220 of a battery management process based on subsystem circuit and function power requirements. Step 222 assigns power requirements for each subsystem circuit or function to be controlled. Power requirements may be assigned to the subsystem circuits only, to the functions only, or to both the subsystem circuits and the functions. The power requirements may be assigned by the user or by the manufacturer and stored in memory in the mobile communication device 20. The power requirement may be a battery capacity, a minimum power requirement, or selected power requirement, as described above.

Step 224 monitors the present battery capacity. The monitoring step may be carried out by the battery monitoring circuit 102, or may alternatively be the result of battery data output by a smart battery. Other processes for monitoring the present battery capacity may also be used.

Step 226 determines whether the power requirement of each controlled subsystem circuit or function exceeds the present battery capacity. If no subsystem circuit or function power requirements exceed the present battery capacity, then steps 224 and 226 are repeated.

If any of the power requirements exceed the present battery capacity, however, then the corresponding subsystem circuits or functions are disabled in step 228, and steps 222 and 226 are repeated. The subsystem circuits and functions may be disabled according to assigned power requirements and the interrelation of subsystem circuits and functions. For example, if the power requirements are assigned to subsystem circuits only, then a function required to be supported by a disabled subsystem circuit is preferably likewise disabled.

If the power requirements are assigned to functions only, however, then subsystem circuits that support a disabled function will be precluded from operating to execute the disabled function. Such subsystem circuits may still be used to execute other supported and enabled functions, however. For example, if a voice function fv is disabled and a data function fd is enabled, a communication subsystem will be precluded from operating to execute the voice function fv, but will be allowed to operate to execute the data function fd.

If the power requirements are assigned to both functions and subsystem circuits, then the functions and subsystem circuits may be disabled by combining the disabling routines described above.

Figure 8:
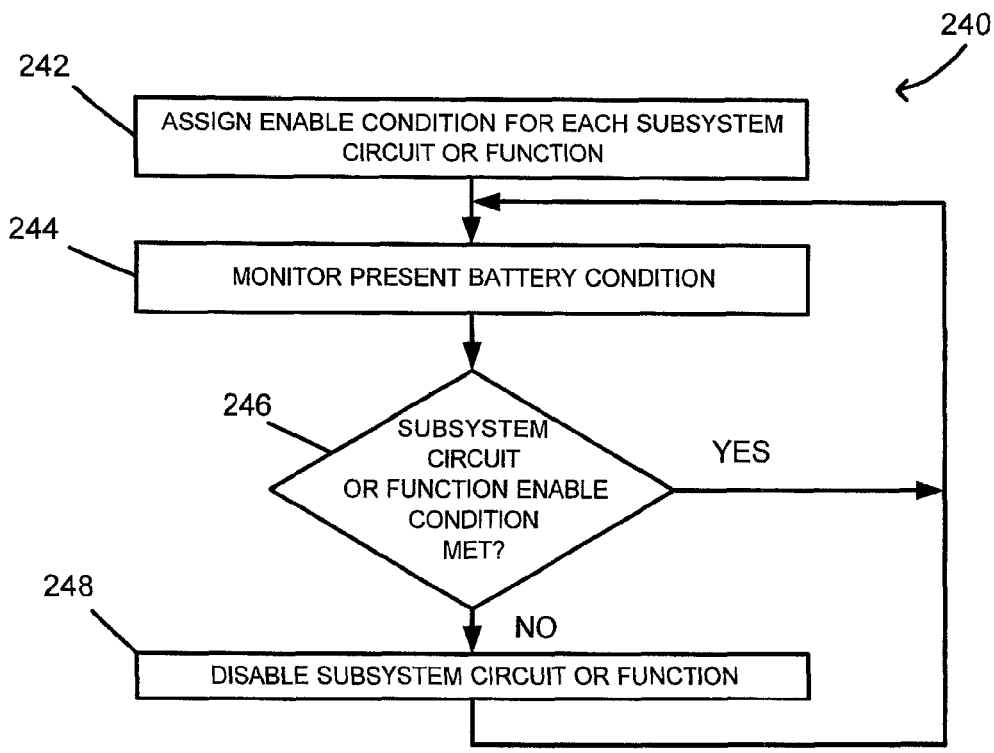
FIG. 8 is a flow diagram of a battery management process based on subsystem circuit and function enable conditions.

FIG. 8 is a flow diagram 240 of a battery management process based on subsystem circuit and function enable conditions. In step 242, an enable condition is assigned for each subsystem circuit or function to be controlled. Enable conditions may be assigned by a user or a manufacturer of a device to the subsystem circuits only, to the functions only, or to both the subsystem circuits and the functions.

Present battery condition is monitored at step 244. This monitoring step may be carried out by the battery monitoring circuit 102, or may alternatively be the result of battery data output by a smart battery. Other processes for monitoring the present battery condition may also be used. At step 246, it is determined whether the subsystem circuit or function enable conditions are met based on the present battery condition. If the subsystem circuit or function enable conditions are met, then steps 244 and 246 are repeated. Where any of the subsystem circuit or function enable conditions are not met, however, the corresponding subsystem circuits or functions are disabled in step 248, and steps 244 and 246 are repeated. The subsystem circuits and functions may be disabled according to enable conditions and the interrelation of subsystem circuits and functions as previously described.

Figure 9:
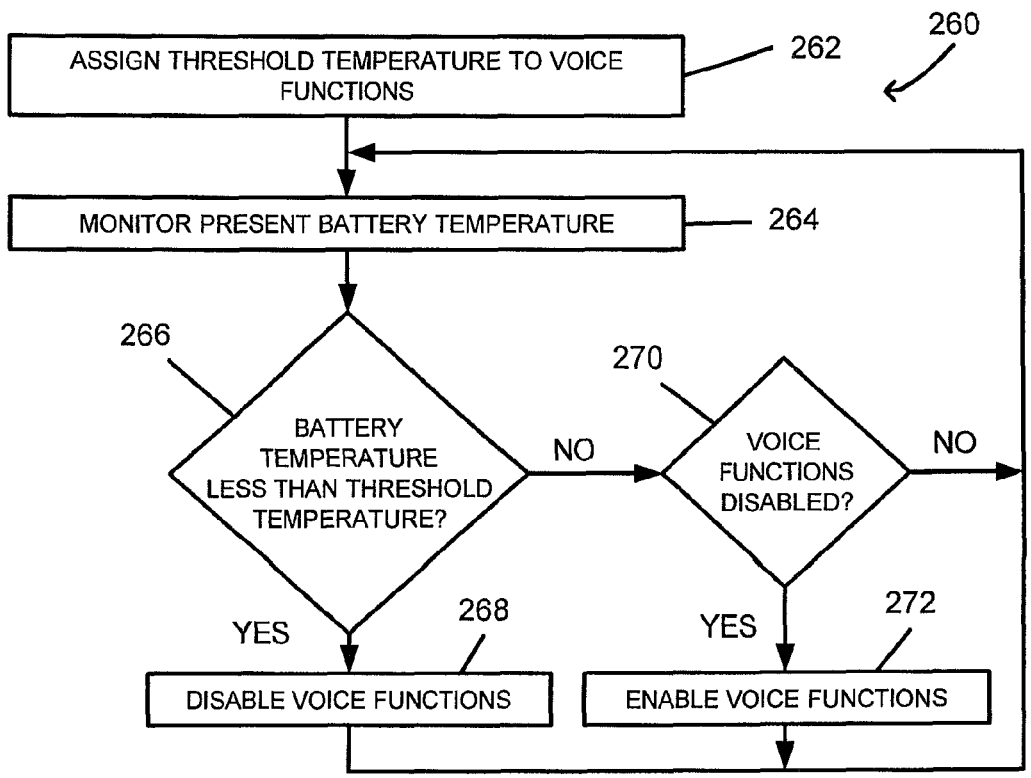
FIG. 9 is a flow diagram of a battery management process based on function threshold temperatures.

FIG. 9 is a flow diagram 260 of a battery management process based on function threshold temperatures. In this embodiment, the functions are categorized according to voice functions and non-voice functions. It should be apparent that other categorizations may also be used.

A threshold temperature is assigned to the voice functions at step 262. The threshold temperature specifies a minimum battery temperature for execution of the voice functions. The threshold temperature may be assigned by the user, assigned by the manufacturer and stored in memory, or stored as data in a smart battery, as described above.

At step 264, battery temperature is monitored. The present battery temperature may be measured by the battery monitoring circuit 102 or provided as data output by a smart battery. Where it is determined at step 266 that the battery temperature is less than the threshold temperature, the voice functions are disabled in step 268, and the process returns to step 264.

If the battery temperature is not less than the threshold temperature, then step 270 determines if voice functions have been previously disabled. If voice functions have not been previously disabled, then the process returns to step 264. If voice functions have been previously disabled, however, then the voice functions are enabled in step 272, and the process returns to step 264. Step 270 thus provides for reactivation of voice functions that have been previously disabled due to a cold battery temperature.

Figure 10:
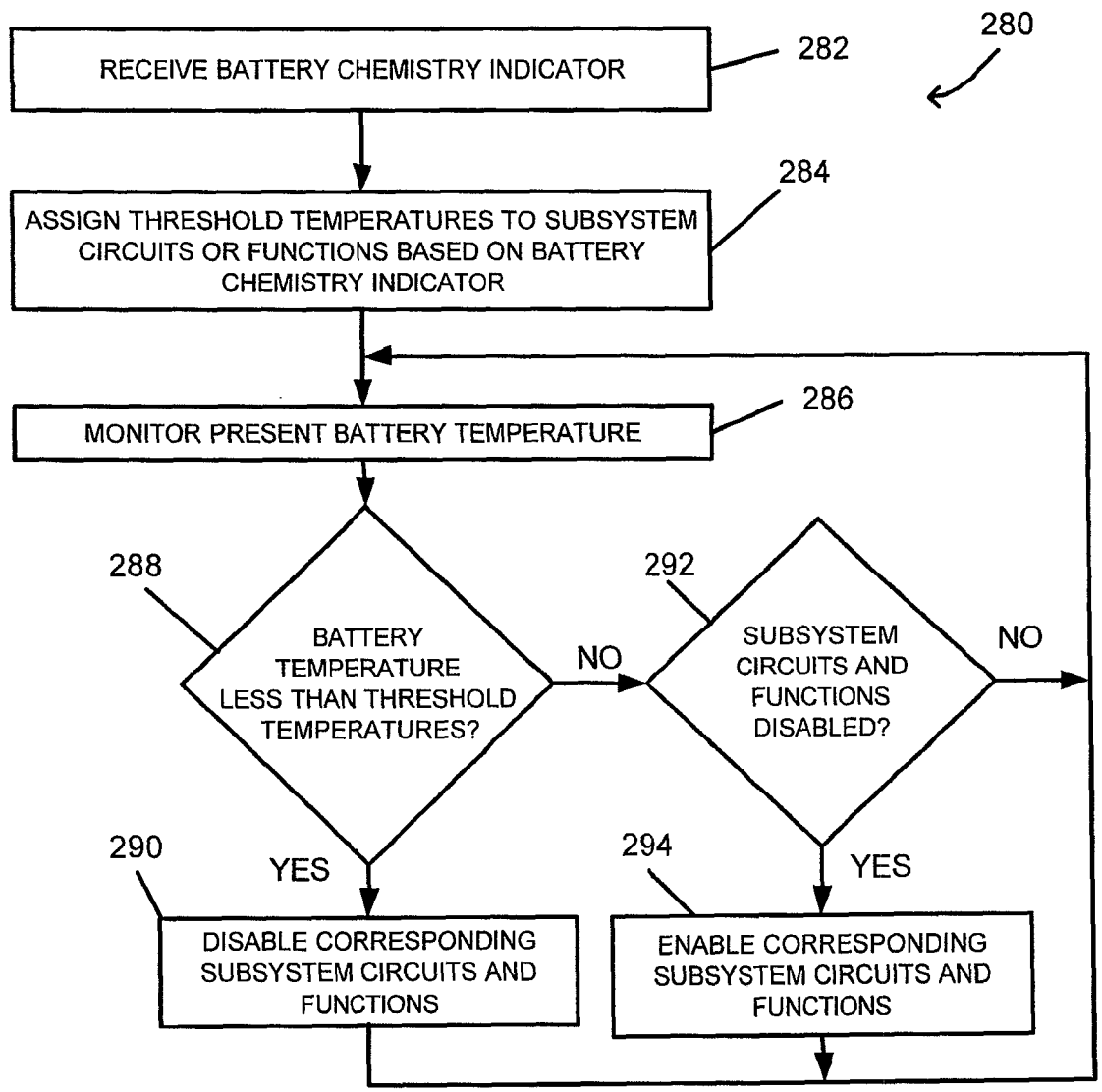
FIG. 10 is a flow diagram of a battery management process based on function threshold temperatures and battery chemistry.

FIG. 10 is a flow diagram 280 of a battery management process based on function threshold temperatures and battery chemistry. In this embodiment, the enable temperatures may change based on battery chemistry.

A battery chemistry indicator is received at step 282. The battery chemistry indicator may be input by the user, stored as a default indicator by the manufacturer, or provided by a smart battery, as described above. Step 284 assigns a threshold temperature to subsystem circuits, functions, or both, based on the battery chemistry indicator. The assigned threshold temperatures may be one of several sets of threshold temperatures stored in a memory in the mobile communication device, in which each set of threshold temperatures corresponds to a particular battery chemistry. Alternatively, if the battery is a smart battery or includes a memory device, then the threshold temperatures may be stored in a memory device included in the battery and provided to the battery management module 100.

The battery temperature is monitored at step 286. The present battery temperature may be measured by the battery monitoring circuit 102 or provided as data output by a smart battery, as described above. Step 288 determines whether the battery temperature is less than the threshold temperatures. If the battery temperature is less than the threshold temperatures, then corresponding subsystem circuits and functions are disabled in step 290, and the process returns to step 286.

If the battery temperature is not less than the threshold temperatures, then step 292 determines whether corresponding subsystem circuits and functions have been previously disabled. If corresponding subsystem circuits and functions have not been previously disabled, then the process returns to step 286. If corresponding subsystem circuits and functions have been previously disabled, however, then the corresponding subsystem circuits and functions are enabled in step 294, and the process returns to step 286.

Those skilled in the art to which the present invention pertains will appreciate that the flow diagrams in FIGS. 6-10 are intended for illustrative purposes. Battery management methods may include further, fewer, or different steps, than those shown in FIGS. 6-10, or perform steps in a different order than shown, without departing from the scope of the present invention. For example, the various monitoring and determining steps may be substantially continuous, in that a particular condition is monitored until some criterion is satisfied and further action is taken. In FIG. 6, for example, battery capacity depletion may be monitored until a subsystem circuit or function depletes its allocated battery capacity, at which point the subsystem circuit or function is disabled. The monitoring either resumes after the subsystem circuit or function has been disabled, or continues while the subsystem circuit or function is being disabled.

In an alternative embodiment, the action of disabling a subsystem circuit is dependent upon a user input. In this embodiment, a user is notified that a subsystem circuit or function is about to be disabled, and is given a predetermined time period in which to take some action to avoid the subsystem circuit or function being disabled. The subsystem circuit or function is then disabled either in response to a user input to confirm that the subsystem circuit or function should be disabled, or after the predetermined time period expires. Where the user selects an "Abort" or "Cancel Disable" function, or makes some other input to avoid disabling the subsystem circuit or function before the predetermined time period expires, the subsystem circuit or function is not disabled. In an allocated capacity-based battery management scheme, a user may be prompted to re-allocate battery capacity or select from which other allocation(s) the power required for the subsystem circuit or function that was to be disabled should be deducted. Alternatively, other allocations can be reduced on an equal or pro-rata apportion scheme as described above. This type of override feature is useful to prevent interruption of an important function when other subsystem circuits or functions have available allocated capacity. For example, a user may choose to extend an urgent voice call at any cost to other functions, or to make use of battery capacity that has been allocated to a voice function for a data function when a communication network in which a device is currently operating supports only data communications. Similar manual override of other battery management schemes, such as to ignore selected enable conditions, will be apparent to those skilled in the art.

Figure 11:
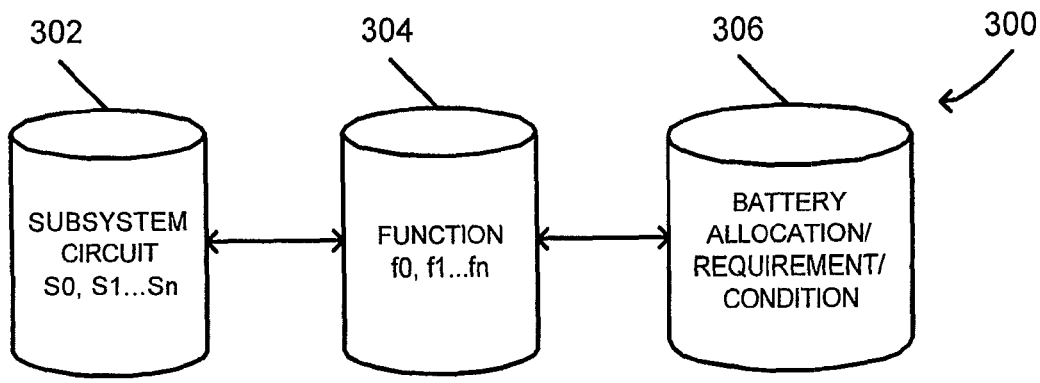
FIG. 11 is a data structure describing the interrelation of subsystem circuits, functions, and corresponding battery allocations, requirements, or conditions.

FIG. 11 is a data structure 300 describing the interrelation of subsystem circuits, functions, and corresponding battery allocations, requirements, or conditions. The data structure 300 may be stored in a memory in a mobile communication device, or in some other computer readable medium.

The data structure may comprise a database, an indexed file, or any other data structure that describes the interrelation of subsystem circuits, functions, and corresponding battery allocations, requirements, or conditions. In the embodiment of FIG. 11, a database structure is used, and the data structure 300 comprises a subsystem circuit database 302, a function database 304, and a battery allocation/requirement/condition database 306.

The subsystem circuit database 302 and the function database 304 specify the interrelation of the subsystem circuits required to support a given function. The battery allocation/requirement/condition database 306 specifies the association of the battery allocations, requirements, or conditions to each subsystem circuit or function.

Accordingly, if the battery allocations, requirements or conditions are associated with functions only, then the battery management module 100 may preclude operation of corresponding subsystem circuits based on the interrelation described by the subsystem circuit database 302 and the function database 304. Alternatively, if the battery allocations, requirements, or conditions are associated with subsystem circuits only, then the battery management module 100 may preclude operation of a corresponding function based on the interrelation described by the subsystem circuit database 302 and the function database 304.

Figure 12:
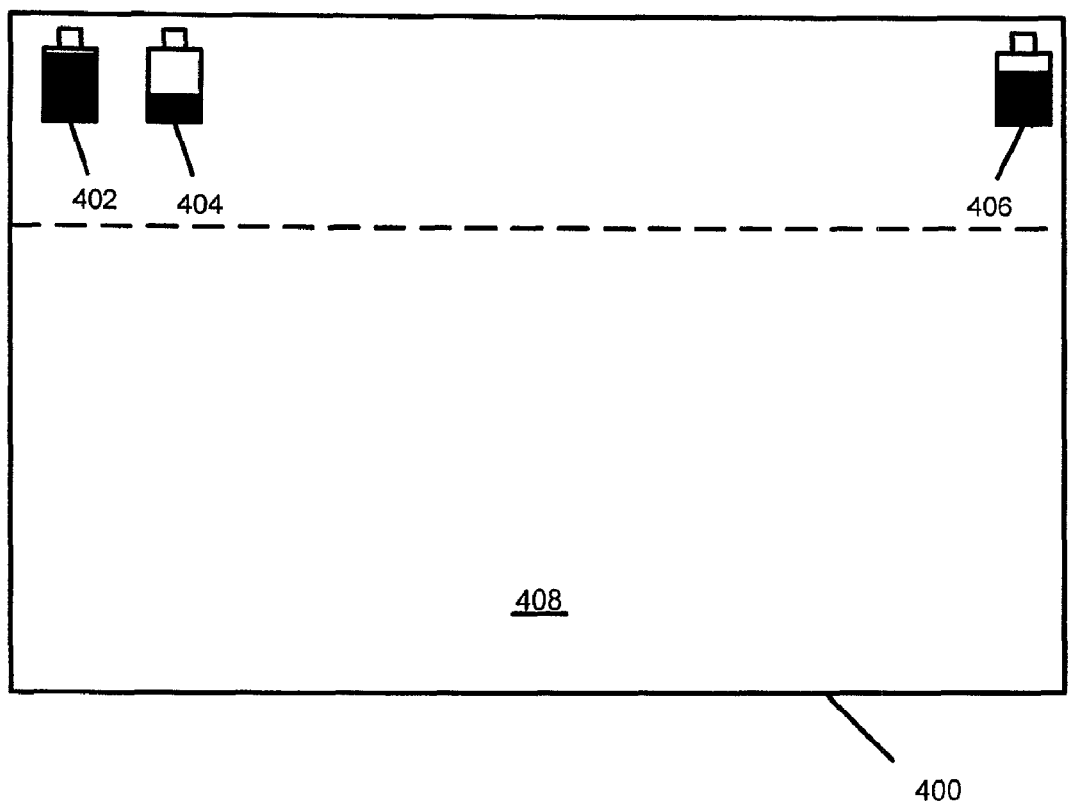
FIG. 12 is a display illustrating remaining allocated battery capacity.

FIG. 12 is an exemplary display 400 illustrating remaining allocated battery capacity. The display 400 may be implemented in a mobile communication device, for example. Shown in the display 400 are a first battery indicator 402, a second battery indicator 404, and a third battery indicator 406. The first battery indicator 402 corresponds to allocated battery capacity for a first function or set of functions, such as data functions. Likewise, the second battery indicator 404 corresponds to allocated battery capacity for a second function or set of functions, such as voice functions. The third battery indicator 406 corresponds to the total remaining battery capacity.

The lower region 408 of the display 400 is used to display various function data, such as call data, web page data, and the like. The battery indicators 402, 404, and 406 may be displayed when a mobile communication device is in a standby mode, and may be removed during the performance of functions to provide for additional display area for displaying function data.

Additional battery indicators may be displayed if the user has specified additional allocations. Furthermore, each battery indicator 402 and 404 may correspond to a node in a hierarchical allocation, such as the hierarchical allocation of FIG. 3. For example, the first battery indicator 402 may correspond to the function node fd of FIG. 3, and the second battery indicator 404 may correspond to the function node fv of FIG. 3. When hierarchical allocation is used, selection of a battery indicator 402 or 404 may also cause battery indicators for functions that are lower in the hierarchy to be displayed. In the example of FIG. 3, with the first and second battery indicators 402 and 404 corresponding to fd and fv, respectively, selecting the battery indicator 402 causes battery indicators for the functions fde and fdw to be displayed. Likewise, selecting the second battery indicator 404 causes battery indicators for functions fva and fvd to be displayed.

Thus, by allocating battery capacity among subsystem circuits or functions, the user may create "virtual batteries." Depletion of one virtual battery will preclude operation of functions associated with that virtual battery, but will not preclude operation of functions associated with other virtual batteries that are not depleted.

The user may bypass or override the battery allocation at the user's discretion, as described above. Furthermore, the battery allocation may be temporarily disabled when the mobile communication device is powered by an alternate power source, such as a recharging device. Additionally, during recharge, the battery allocations may be retained, and thus the user need not reallocate battery capacity after each battery charge.

In another, different embodiment, a battery energy pool (e.g., milliamp-hours) may be allocated and monitored. The energy pool can be associated with subsystem circuits or functions, and monitored and compared to the present expenditure of battery energy. The activation of the subsystem circuits or functions can be based on the comparison. For example, the activation of the subsystem circuits or functions may involve disabling the subsystem circuits or functions when the expended energy exceeds the energy pool.

Conversely, all other unrelated subsystem circuits or functions may be disabled when the expended energy exceeds the energy pool. For example, an energy pool may be allocated to an emergency service call, such as a 911 call. If the expended energy exceeds the energy pool, then all other subsystem circuits and functions not related to the emergency service (e.g., calendar functions, ring adjustment functions and related I/O circuitry, etc.) may be disabled to conserve battery energy for the emergency service.

Figure 13:
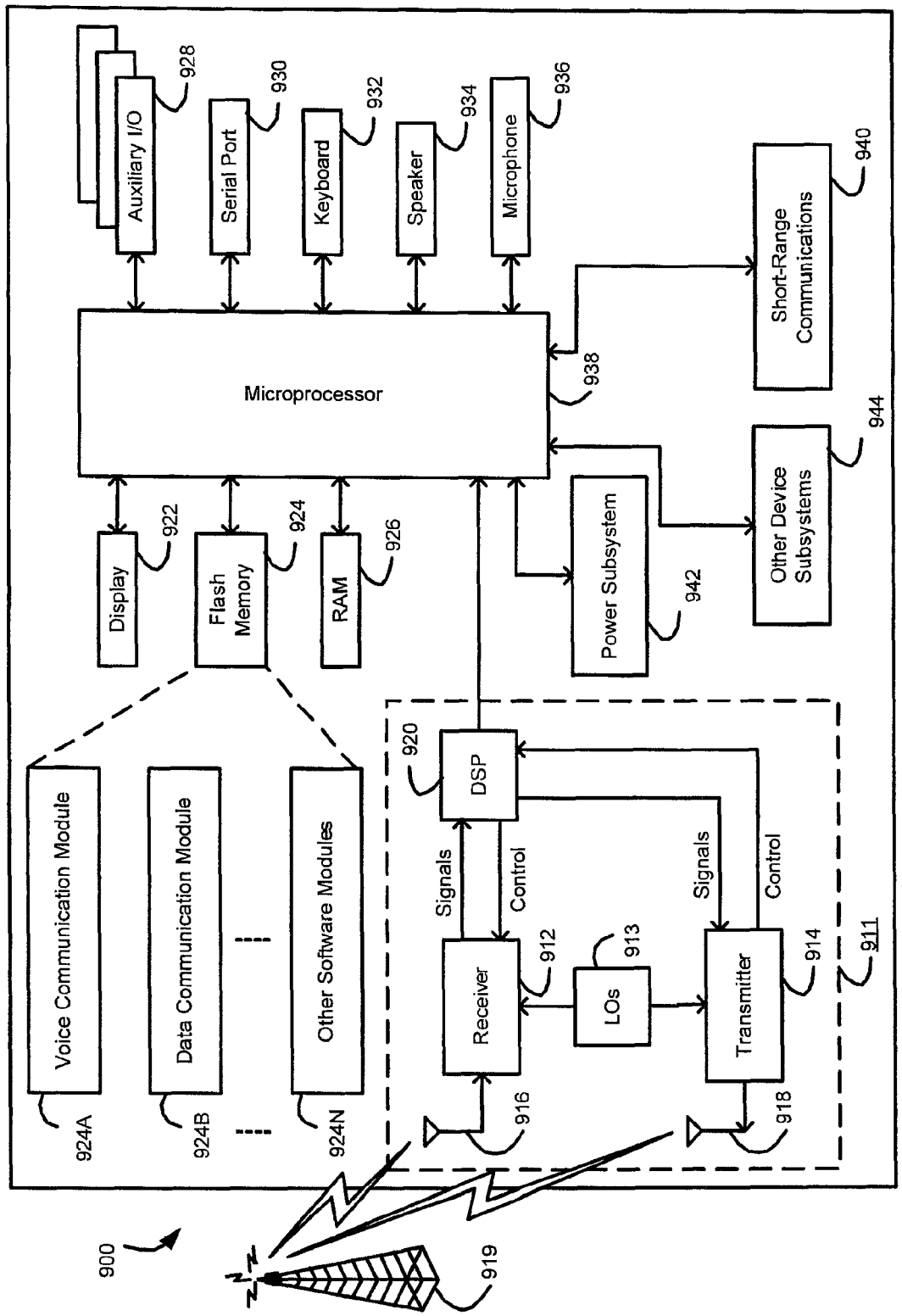
FIG. 13 is a block diagram of a mobile communication device.

FIG. 13 is a block diagram of an exemplary mobile communication device 900 in which the systems and methods disclosed herein may be implemented. The wireless device 900 is preferably a two-way communication device having at least voice and data communication capabilities. The voice communications may be implemented over either an analog or digital voice communication channel. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 900 is enabled for two-way communications, the device will incorporate a communication subsystem 911, including a receiver 912, a transmitter 914, and associated components such as one or more, preferably embedded or internal, antenna elements 916 and 918, local oscillators (LOs) 913, and a processing module such as a digital signal processor (DSP) 920. The particular design of the communication subsystem 911 will be dependent upon the communication network in which the device is intended to operate. For example, a device 900 destined for a North American market may include a communication subsystem 911 designed to operate within the Mobitex mobile communication system or DataTAC mobile communication system, whereas a device 900 intended for use in Europe may incorporate a General Packet Radio Service (GPRS) communication subsystem 911.

Network access requirements will also vary depending upon the type of network 919. For example, in the Mobitex and DataTAC networks, mobile devices such as 900 are registered on the network using a unique personal identification number or PIN associated with each device. In GPRS networks, however, network access is associated with a subscriber or user of a device 900. A GPRS device, therefore, requires a subscriber identity module (not shown), commonly referred to as a SIM card, in order to operate on a GPRS network. Without a SIM card, a GPRS device will not be fully functional. Local or non-network communication functions (if any) may be operable, but the device 900 will be unable to carry out any functions involving communications over network 919. When required network registration or activation procedures have been completed, a device 900 may send and receive communication signals over the network 919. Signals received by the antenna 916 through a communication network 919 are input to the receiver 912, which may perform such common receiver functions as signal amplification, frequency down conversion, filtering, channel selection and the like, and in the example system shown in FIG. 13, analog to digital conversion. Analog to digital conversion of a received signal allows more complex communication functions, such as demodulation and decoding, to be performed in the DSP 920. In a similar manner, signals to be transmitted are processed, including modulation and encoding, for example, by the DSP 920 and input to the transmitter 914 for digital to analog conversion, frequency up conversion, filtering, amplification and transmission over the communication network 919 via the antenna 918.

The DSP 920 not only processes communication signals, but also provides for receiver and transmitter control. For example, the gains applied to communication signals in the receiver 912 and transmitter 914 may be adaptively controlled through automatic gain control algorithms implemented in the DSP 920.

The device 900 preferably includes a microprocessor 938, which controls the overall operation of the device. Communication functions, including at least data and voice communications, are performed through the communication subsystem 911. The microprocessor 938 also interacts with further device subsystems, such as the display 922, Flash memory 924, random access memory (RAM) 926, auxiliary input/output (I/O) subsystems 928, serial port 930, keyboard 932, speaker 934, microphone 936, a short-range communications subsystem 940, a power subsystem 942, and any other device subsystems generally designated as 944.

Some of the subsystems shown in FIG. 13 perform communication-related functions, whereas other subsystems may provide "resident" or on-device functions. Notably, some subsystems, such as keyboard 932 and display 922, for example, may be used for both communication-related functions, such as entering a text message for transmission over a communication network and device-resident functions such as a calculator or task list.

Operating system software used by the microprocessor 938 is preferably stored in Flash memory 924, which may instead be a battery backed-up RAM or other non-volatile storage element. The operating system, specific device applications, or parts thereof, may be temporarily loaded into a volatile store such as RAM 926. Received communication signals may also be stored to RAM 926. Flash memory 924 preferably includes data communication module 924B when device 900 is enabled for data communications, and when device 900 is enabled for voice communication, a voice communication module 924A. Also included in Flash memory 924 are other software modules 924N. In particular, the battery management system 20 software may be implemented in a software module, such as software module 924N.

The microprocessor 938, in addition to its operating system functions, preferably enables execution of software applications on the device. A predetermined set of applications that control basic device operations, including at least data and voice communication applications, for example, will normally be installed on the device 900 during manufacture. A preferred application that may be loaded onto the device may be a personal information manager (PIM) application having the ability to organize and manage data items relating to the device user, such as, but not limited to, e-mail, calendar events, voice mails, appointments, and task items. Naturally, one or more memory stores would be available on the device to facilitate storage of PIM data items on the device. Such PIM application would preferably have the ability to send and receive data items via the wireless network. In a preferred embodiment, the PIM data items are seamlessly integrated, synchronized and updated, via the wireless network, with the device user's corresponding data items stored or associated with a host computer system.

Further applications may also be loaded onto the device 900 through the network 919, an auxiliary I/O subsystem 928, serial port 930, short-range communications subsystem 940 or any other suitable subsystem 944, and installed by a user in the RAM 926 or a non-volatile store for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the device 900.

In a data communication mode, a received signal such as a text message or web page download will be processed by the communication subsystem 911 and input to the microprocessor 938, which will preferably further process the received signal for output to the display 922, or alternatively, to an auxiliary I/O device 928. A user of device 900 may also compose data items, such as e-mail messages, for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of the device 900 is substantially similar, except that received signals would preferably be output to a speaker 934 and signals for transmission would be generated by a microphone 936. Alternative voice or audio I/O subsystems, such as a voice message recording subsystem, may also be implemented on the device 900. Although voice or audio signal output is preferably accomplished primarily through the speaker 934, the display 922 may also be used to provide an indication of the identity of a calling party, the duration of a voice call, or other voice call related information, for example.

Depending on the enable condition, a particular function associated with a subsystem circuit may be disabled, or an entire subsystem circuit may be disabled. For example, if the battery temperature is low, then voice functions may be disabled, but data communications, such as e-mail, may still be enabled over the communication subsystem 911.

The serial port 930 would normally be implemented in a personal digital assistant (PDA)-type communication device for which synchronization with a user's desktop computer (not shown) may be desirable, but is an optional device component. Such a port 930 would enable a user to set preferences through an external device or software application and would extend the capabilities of the device by providing for information or software downloads to the device 900 other than through a wireless communication network. The alternate download path may, for example, be used to load an encryption key onto the device through a direct and thus reliable and trusted connection thereby to enable secure device communication.

A short-range communications subsystem 940 is a further optional component which may provide for communication between the device 900 and different systems or devices, which need not necessarily be similar devices. For example, the subsystem 940 may include an infrared device and associated circuits and components or a Bluetooth™ communication module to provide for communication with similarly-enabled systems and devices.

A power subsystem 942 comprises a battery and power distribution and recharge circuitry for providing battery power to the mobile device 900 and for recharging the battery. The power subsystem 942 also includes a battery monitoring circuit that is operable to provide a status of one or more battery status indicators, such as remaining capacity, temperature, voltage, current draw, and the like. The battery status indicators may provided to the microprocessor in digital form.

This written description uses illustrative embodiments to disclose the invention, including the best mode, and also to enable a person of ordinary skill in the art to make and use the invention. Other embodiments and devices are within the scope of the claims if they have elements that do not differ from the literal language of the claims or have elements equivalent to those recited in the claims.

For example, the invention is not limited to monitoring only those battery characteristics described above. In an alternative embodiment, aging effects such as variations in battery chemistry are estimated and used to allocate battery capacity. Aging tends to increase equivalent series resistance (ESR), for instance, which reduces the capacity that can be used effectively for higher power functions or subsystems.

The invention claimed is:

1. A method performed by a battery-operated device, comprising:
    allocating a first portion of a battery capacity to a first function;
    allocating a second portion of the battery capacity to a second function; and
    simultaneously displaying a first indicator relating to the first portion of the battery capacity and a second indicator relating to the second portion of the battery capacity.

2. The method of claim 1 wherein the first and second indicators respectively indicate amounts remaining of the first and second portions.

3. The method of claim 1 wherein the first and second indicators respectively indicate amounts expended of the first and second portions.

4. The method of claim 1 further comprising:
    displaying, simultaneously with the first and second indicators, a third indicator relating to total battery capacity.

5. The method of claim 1 further comprising:
    allocating first and second sub-portions of the first portion to respective first and second sub-functions of the first function; and
    simultaneously displaying first and second subset indicators that respectively relate to the first and second sub-portions of the battery capacity.

6. The method of claim 5 wherein the displaying of the first and second subset indicators is performed in response to inputting, through a user interface of the device, a selection of the first indicator.

7. The method of claim 5 wherein the first function is a voice function, and the first and second sub-functions respectively relate to analog voice processing and digital voice processing.

8. The method of claim 5 wherein the first function is a data function, and the first and second sub-functions respectively relate to email and web browsing.

9. The method of claim 1 wherein the displaying is performed when the device is in standby mode and entails displaying the indicators on a display of the device, and the method further comprises:
    removing the indicators from the display when the display displays information from applications that are called up through a user interface of the device.

10. The method of claim 1 wherein, in the first allocation step, the allocation is based on input through a user interface of the device.

11. The method of claim 1 further comprising:
    disabling the first function when the first portion of the battery capacity is depleted.

12. The method of claim 1 further comprising:
    disabling functions of the device other than the first function when the first portion of the battery capacity is depleted.

13. The method of claim 1 wherein the battery-operated device is a mobile communication device.

14. A battery-operated device comprising:
    a battery management module that allocates a first portion of a battery capacity of the device to a first function and a second portion of the battery capacity to a second function; and
    a display configured to simultaneously display a first indicator relating to the first portion of the battery capacity and a second indicator relating to the second portion of the battery capacity.

15. The device of claim 14 wherein the first and second indicators respectively indicate amounts remaining of the first and second portions.

16. The device of claim 14 further comprising:
    means for displaying, simultaneously with the first and second indicators, a third indicator relating to total battery capacity.

17. The device of claim 14 wherein the battery-operated device is a mobile communication device.

18. Machine-readable storage medium or mediums encoded with instructions that cause a battery-operated device to perform a method comprising the steps of:
    allocating a first portion of a battery capacity to a first function;
    allocating a second portion of the battery capacity to a second function; and
    simultaneously displaying a first indicator relating to the first portion of the battery capacity and a second indicator relating to the second portion of the battery capacity.

19. The medium or mediums of claim 18 wherein, in the first allocation step, the allocation is based on input through a user interface of the device.

20. The medium or mediums of claim 18 wherein the device is a mobile communication device.

* * * * *